Jan. 13, 1931. M. E. THORNTON 1,788,752
TOY
Filed Jan. 12, 1929
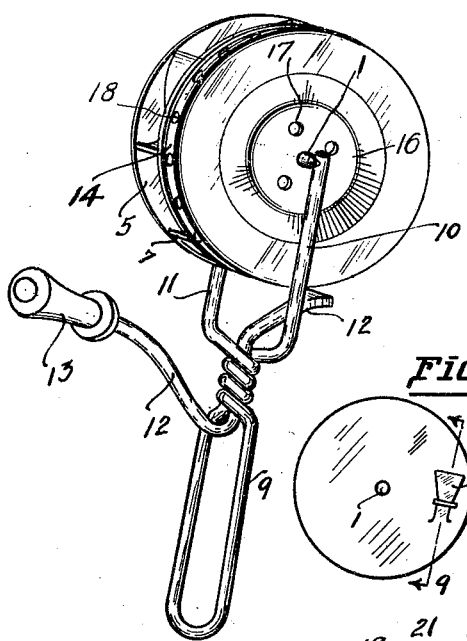
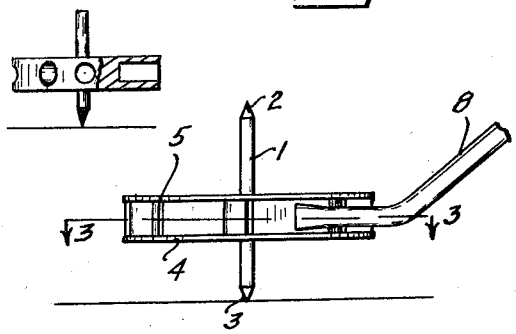
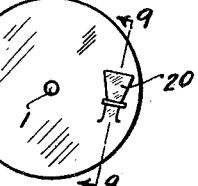
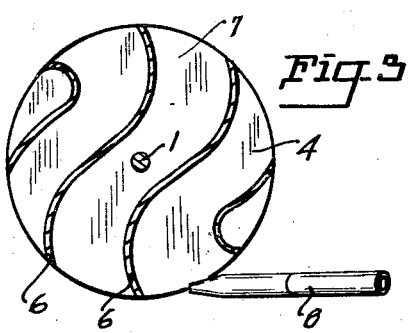
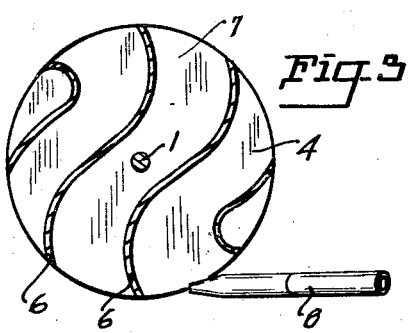
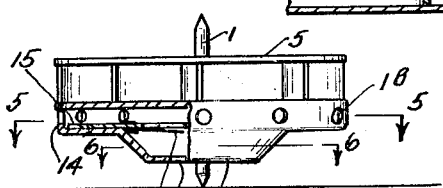
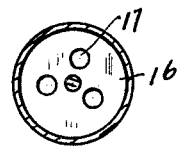
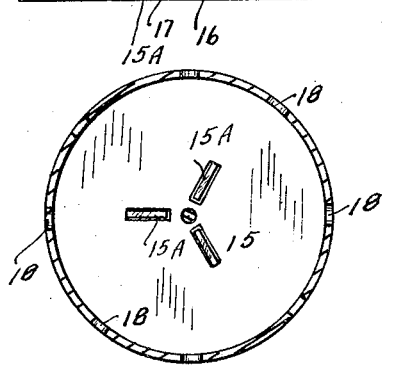
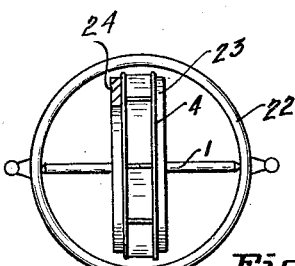
Inventor
Malcolm E. Thornton
By Thomas Lily jr
Attorney Patented Jan. 13, 1931

1,788,752

UNITED STATES PATENT OFFICE

MALCOLM E. THORNTON, OF PORTLAND, OREGON

TOY

Application filed January 12, 1929. Serial No. 332,128.

The purpose and object of my device, is for the amusement of children and others.

A further object of my device, is for the purpose of developing the lungs of children and others.

A still further object of my device, is a top assembly, a frame for a rotor and an air applicator associated therewith, through the use of which high speeds may be obtained and musical notes created.

With these and incidental objects in view, the invention consists in certain novel features of construction and combination of parts, the essential elements of which are set forth in the appended claims, and to a preferred form of embodiment of which is hereinafter shown with reference to the drawings which accompany and form a part of this specification.

In the drawings:

Fig. 1 is a perspective side view of the assembled device, illustrating the rotor supported within a suitable bifurcated frame and the frame having an air blow pipe, made integral therewith, for creating rotation to the rotor.

Fig. 2 is a side view, of a modified form of rotor, shown removed from the frame.

Fig. 3 is a sectional, top, plan view, taken on line 3—3 of Fig. 2, looking in the direction indicated.

Fig. 4 is a vertical, side view, partially in section, of the rotor of Fig. 1, which may be used for the creating of musical notes when run at relatively high speeds.

Fig. 5 is a sectional, plan view, taken on line 5—5 of Fig. 4, looking in the direction indicated.

Fig. 6 is a sectional, plan view, taken on line 6—6 of Fig. 4, looking in the direction indicated.

Fig. 7 is an end view, partially in section, of another modified form of rotor, supported within a frame.

Fig. 8 is a top, plan view, of a modified form of side walls having a projecting lip disposed outwardly therefrom to form a whistle of the top when run at high speed.

Fig. 9 is a fragmentary, sectional, side view taken on line 9—9 of Fig. 8, looking in the direction indicated.

Fig. 10 is a side view, partially in section, of a modified form of my device, illustrating the same made from suitable material and having holes formed in the outer periphery of the device against which the air from the blow pipe may be made to engage to spin the top.

Like reference characters refer to like parts throughout the several views.

I preferably form the rotor element of a central spindle 1, pointed at oppositely disposed ends 2 and 3 to facilitate the maintaining of the rotor within a suitable frame or to permit the rotor being spun or driven either end up about the spindle 1. Side walls 4 and 5 are formed having a plurality of blades 6, disposed therein to form channels 7 through which air may be made to pass. Air for driving the spindle is supplied through a suitable blow pipe 8. The blow pipe may be made and used as an independent unit in the hand of the operator, or the same may be made integral with the frame of the device. In one of the preferred forms of embodiment, the same is illustrated in Fig. 1, wherein a suitable supporting frame 9 is made in the form of a handle having bifurcated ends 10 and 11 with a suitable bearing formed in the oppositely disposed side walls of the ends into which the spindle 1 is made to engage. A suitable blow pipe 12 is formed integral with the handle or frame structure, terminating in a suitable mouth piece 13.

When a musical rotor is desired to be formed, it is made as illustrated in Fig. 4, which is a preferred embodiment, wherein a side wall 14 having openings 18 disposed therethrough, is disposed adjacent one side having a diaphragm 15 interposed therein, and terminates in a bottom 16 which has openings 17 disposed therethrough. The diaphragm has passageways disposed therethrough. Reeds 15A are placed over the openings in the diaphragm 15 which create a musical note when the air entering through the passageways 18 circulate and pass through the openings disposed within the diaphragm 15 and finally leave the device through the outlet openings 16. The circulation of the air is created by centrifugal force which is caused by the differences in the diameters of the various openings and the rotation of the device. A more shrill note may be created wherein the recess 19 is formed, and wherein a projecting lip 20 outwardly extends from one of the side walls. The lip acting as a gatherer of air when rotated and the cutting of the air and the releasing of the same through a restricted outlet 21, creates a shrill note. A modified form of rotor may be made, as illustrated in Fig. 7, wherein a circular frame 22 is formed with suitable bearings therein for the spindle 1. The frame may be placed in any position and the frame rotated or partially rotated while the rotor is in motion. The rotor may be weighted with relatively heavy side walls 23 and 24 to form a rotor that will run for a relatively long period. The blow pipe may either be secured to the frame 22 or used independently of the frame.

While the form of mechanism herein shown and described, is admirably adapted to fulfill the objects primarily stated, it is to be understood that it is not intended to confine the invention to the one form of embodiment herein shown and described, as it is susceptible of embodiment in various forms all coming within the scope of the claims which follow.

What I claim is:

1. In a device of the class described, the combination of a spindle, circular side walls disposed upon the spindle and in spaced relation therewith, vaned blades mounted between the said side walls in spaced relation with each other, secondary side walls having a plurality of openings disposed therein, a diaphragm disposed about the spindle and within the secondary side walls, and a reed disposed over an opening disposed within the diaphragm.

2. In a device of the class described, the combination of a forked handle having bearings disposed at its lower extremities, a blow pipe fixedly disposed therebetween, a spindle rotatably mounted on the bearings, an annular frame disposed about the spindle, S-shaped blades parallelly disposed in spaced relation within the frame and extending to the outer periphery thereof, said blades being in direct alignment with the opening disposed through the blow pipe, a frustaconical annular wall attached adjacent one side of the annular frame, a plurality of openings disposed through the outer periphery of said wall, a diaphragm disposed within the frustaconical wall, said diaphragm having a plurality of openings disposed centrally thereof, and reeds disposed therebelow, substantially as shown and described.

MALCOLM E. THORNTON.